US012570192B2

(12) United States Patent
Akutsu et al.

(10) Patent No.: US 12,570,192 B2
(45) Date of Patent: Mar. 10, 2026

(54) CONVEYANCE SEAT

(71) Applicants:TS TECH CO., LTD., Asaka (JP);
HONDA MOTOR CO., LTD., Tokyo
(JP)

(72) Inventors: Shuichi Akutsu, Tochigi (JP); **Daichi
Mochizuki, Tochigi (JP); Yushiro
Tachibana, Tokyo (JP); Yasunobu
Kawamoto, Tokyo (JP); Daisuke
Ohkawa, Tokyo (JP); Yusuke Ogata**,
Tokyo (JP)

(73) Assignees: TS TECH CO., LTD., Asaka (JP);
HONDA MOTOR CO., LTD., Tokyo
(JP)

( * ) Notice: Subject to any disclaimer, the term of this
patent is extended or adjusted under 35
U.S.C. 154(b) by 82 days.

(21) Appl. No.: 18/521,455

(22) Filed: Nov. 28, 2023

(65) Prior Publication Data

US 2024/0174146 A1      May 30, 2024

Related U.S. Application Data

(60) Provisional application No. 63/428,847, filed on Nov.
30, 2022.

(30) Foreign Application Priority Data

Apr. 20, 2023      (JP) ................................. 2023-069554

(51) Int. Cl.
B60N 2/58        (2006.01)
B60N 2/70        (2006.01)
(52) U.S. Cl.
CPC ............. B60N 2/5825 (2013.01); B60N 2/58
(2013.01); B60N 2/5816 (2013.01); **B60N
2/70** (2013.01)

(58) Field of Classification Search
CPC ...... B60N 2/58; B60N 2/5816; B60N 2/5825;
B60N 2/60; B60N 2/6018; B60N 2/7041
(Continued)

(56) References Cited

U.S. PATENT DOCUMENTS 3,614,159 A  *  10/1971  Christin ................... A47C 7/18
297/452.27
4,784,437 A  *  11/1988  Shimada .............. B60N 2/7017
297/452.27 X
(Continued)

FOREIGN PATENT DOCUMENTS

JP          2017154668 A        9/2017
JP          2018-158096         10/2018
(Continued)

OTHER PUBLICATIONS

Japanese Notice of Reasons for Refusal (w/ English translation) for
corresponding Application No. 2023-069554, dated Aug. 27, 2024,
8 pages.

*Primary Examiner* — Rodney B White
(74) *Attorney, Agent, or Firm* — Dority & Manning, P.A.

(57)        ABSTRACT

A conveyance seat includes a seat pad; and a skin which
covers the seat pad, wherein the seat pad includes a first pad
member and a second pad member that is harder than the
first pad member, wherein the second pad member includes
a first region and a second region which is harder than the
first region, and wherein an engagement portion that locks
the skin is provided in the first region of the second pad
member.

11 Claims, 11 Drawing Sheets

(58) Field of Classification Search
USPC .............................. 297/218.1, 218.2, 452.27
See application file for complete search history.

(56) References Cited

U.S. PATENT DOCUMENTS

| | | | | |
|---|---|---|---|---|
| 4,789,201 | A * | 12/1988 | Selbert .................. | B60N 2/5825 |
| | | | | 297/218.1 X |
| 4,865,379 | A * | 9/1989 | Aoki ......................... | B60N 2/70 |
| | | | | 297/452.27 X |
| 5,023,125 | A * | 6/1991 | Gray .................... | B60N 2/5833 |
| | | | | 297/218.1 X |
| 5,028,472 | A * | 7/1991 | Gray ........................ | B60N 2/60 |
| | | | | 297/218.1 X |
| 5,283,918 | A * | 2/1994 | Weingartner ............ | D04B 1/22 |
| | | | | 297/452.27 X |
| 5,630,240 | A * | 5/1997 | Matsuoka ................ | B60N 2/58 |
| | | | | 297/452.27 X |
| 5,632,053 | A * | 5/1997 | Weingartner .......... | D04B 21/14 |
| | | | | 297/452.27 X |
| 5,654,069 | A * | 8/1997 | Matsuoka ........... | B29C 44/0469 |
| | | | | 297/452.26 X |
| 5,702,159 | A * | 12/1997 | Matsuoka ............ | B60N 2/5875 |
| | | | | 297/218.2 X |
| 5,716,096 | A * | 2/1998 | Pryde ..................... | B60N 2/609 |
| | | | | 297/228.1 X |
| 5,833,313 | A * | 11/1998 | Kaneda .................. | A47C 31/00 |
| | | | | 297/218.1 X |
| 5,931,538 | A * | 8/1999 | Cayet ....................... | B60N 2/58 |
| | | | | 297/218.1 X |
| 6,089,657 | A * | 7/2000 | Banno .................... | A47C 7/029 |
| | | | | 297/452.27 X |
| 8,360,530 | B2 * | 1/2013 | Onoda ................. | B60N 2/7035 |
| | | | | 297/452.27 X |
| 8,662,560 | B2 * | 3/2014 | Galbreath .............. | B60N 2/015 |
| | | | | 297/452.27 X |
| 9,573,503 | B2 * | 2/2017 | Nie .......................... | B60N 2/68 |
| 10,596,940 | B2 * | 3/2020 | Zalzala .................... | B60N 2/58 |
| 10,682,939 | B2 * | 6/2020 | Araki ................... | B60N 2/7017 |
| 10,814,759 | B2 * | 10/2020 | Zalzala ................. | B60N 2/686 |
| 2009/0146472 | A1 * | 6/2009 | Galbreath .............. | B60N 2/646 |
| | | | | 297/452.27 X |
| 2010/0259079 | A1 * | 10/2010 | Matsuzaki ........... | B60N 2/5883 |
| | | | | 297/218.2 X |
| 2018/0272905 | A1 | 9/2018 | Ruff et al. | |
| 2019/0009700 | A1 | 1/2019 | Hojo | |
| 2019/0176668 | A1 | 6/2019 | Araki et al. | |
| 2020/0254913 | A1 | 8/2020 | Hojo | |
| 2021/0284053 | A1 | 9/2021 | Hojo | |
| 2023/0064863 | A1 | 3/2023 | Hojo | |
| 2024/0025320 | A1 | 1/2024 | Hojo | |

FOREIGN PATENT DOCUMENTS

| | | |
|---|---|---|
| JP | 2019088386 A | 6/2019 |
| JP | 2019098107 A | 6/2019 |

* cited by examiner

UP

RIGHT ← → REAR

FRONT ↙ ↘ LEFT

DOWN

FIG. 3

DOWN

REAR

LEFT

RIGHT

FRONT

UP

INSIDE ←→ OUTSIDE

UP

DOWN

UP

OUTSIDE ← → INSIDE

DOWN

CONVEYANCE SEAT

CROSS-REFERENCE TO RELATED APPLICATIONS

This application claims priority to U.S. Provisional Patent Application No. 63/428,847, filed on Nov. 30, 2022, and Japanese Patent Application No. 2023-069554, filed on Apr. 20, 2023, both of which are hereby incorporated herein by reference in their entireties for all purposes.

BACKGROUND OF THE INVENTION

Field of the Invention

The present invention relates to a conveyance seat and particularly to a conveyance seat including a seat pad and a skin covering the seat pad.

Description of the Related Art

Conventionally, as shown in Japanese Patent Laid-Open No. 2018-158096, there is known a seat pad composed of two layers of pad members having different hardnesses. Rigidity is maintained while improving the seating feeling by using urethane foam as the pad member on the seating surface side (surface layer side) and using expanded polypropylene (EPP) as the pad member on the back layer side.

When the seat pad composed of two layers of pad members shown in Japanese Patent Laid-Open No. 2018-158096 is covered with a skin, conventionally, the skin is fixed to the seat pad by inserting a locking member such as a clip or an arrowhead provided at the end portion of the skin into a hole or the like formed in the pad member.

However, there is a problem in that the pad member on the back layer side as the skin attachment side is not easily bent and the skin is not easily assembled.

In consideration of the above problems, the present invention is to provide a conveyance seat in which a skin can be easily assembled to a seat pad composed of two layers of pad members.

SUMMARY OF THE INVENTION

According to a conveyance seat of the present invention, the above-described problems are solved by a conveyance seat including: a seat pad; and a skin which covers the seat pad, wherein the seat pad includes a first pad member and a second pad member that is harder than the first pad member, wherein the second pad member includes a first region and a second region which is harder than the first region, and wherein an engagement portion that locks the skin is provided in the first region of the second pad member.

Since the engagement portion for locking the skin is provided in the first region having a low hardness in the second pad member, the first region is easily bent when assembling the skin and hence the skin is easily assembled.

In the above-described configuration, the engagement portion may be provided in the first region located in front of the second region or the first region located behind the second region.

The first region located in front of or behind the second region is easily bent compared to other portions. Therefore, since the engagement portion is provided in the first region located in front of or behind the second region, the skin is more easily assembled.

Further, in the above-described configuration, the engagement portion may include a front engagement portion which is provided on the front side of the first region and a rear engagement portion which is provided on the rear side of the first region, and the second region may be sandwiched between the front engagement portion and the rear engagement portion.

Since the second region is sandwiched between the front engagement portion provided on the front side of the first region and the rear engagement portion provided on the rear side of the first region, the rigidity of the entire second pad member is improved.

Further, in the above-described configuration, the second region may extend from an upper surface to a lower surface of the second pad member, and the engagement portion may be provided above a lower end of the second region.

Since the engagement portion is provided above the lower end of the second region, the load input to the end portion of the skin, for example, in the event of a submarine phenomenon is reduced and hence skin detachment is suppressed.

Further, in the above-described configuration, the engagement portion provided above the lower end of the second region may be provided in the first region located in front of the second region.

Since the engagement portion is provided in the first region located in front of the second region, it is possible to further improve an effect of suppressing skin detachment in the event of a submarine phenomenon.

Further, in the above-described configuration, the first region of the second pad member may be provided with a thin portion which is formed to be partially thin and a thick portion which is formed to be thicker than the thin portion, the engagement portion may include a first engagement portion which is provided in the thin portion and a second engagement portion which is provided in the thick portion, and a length of the first engagement portion in a width direction orthogonal to a locking direction in which the first engagement portion locks the skin may be larger than a length of the second engagement portion in a width direction orthogonal to a locking direction in which the second engagement portion locks the skin.

Since the length in the width direction of the first engagement portion provided in the thin portion is larger than the length in the width direction of the second engagement portion provided in the thick portion, for example, it is possible to maintain the rigidity of the first engagement portion of the thin portion and in the periphery thereof.

Further, in the above-described configuration, the thin portion of the first region may be provided in front of the second region, and the first engagement portion may be disposed in front of the second region.

Since the thin portion is provided on the front side of the second pad member, for example, it is possible to reduce manufacturing costs by reducing the amount of materials (pad materials) to be used.

Further, in the above-described configuration, the first region of the second pad member may be provided with a floor fixing portion that fixes the second pad member to a vehicle body floor, and the engagement portion may be provided at a position avoiding the floor fixing portion.

Since the engagement portion is provided at a position avoiding the floor fixing portion, the input load is distributed and the submarine phenomenon can be suppressed.

Further, in the above-described configuration, the floor fixing portion and the second region may be located at an overlapping position in a right to left direction of the seat pad.

Since the floor fixing portion and the second region are located at an overlapping position in the right to left direction of the seat pad, the input load is distributed and an effect of suppressing the submarine phenomenon is further improved.

Further, in the above-described configuration, the conveyance seat may further include: a seat cushion which supports buttocks of an occupant and includes the seat pad and the skin; a seat back which supports a back of the occupant; and a headrest which is coupled to the seat back and supports a head of the occupant.

Advantageous Effects of Invention

According to the present invention, since the engagement portion for locking the skin is provided in the first region having a low hardness in the second pad member, the first region is easily bent when assembling the skin and hence the skin is easily assembled.

Further, according to the above-described configuration, the first region located in front of or behind the second region is easily bent compared to other portions. Therefore, since the engagement portion is provided in the first region located in front of or behind the second region, the skin is more easily assembled.

Further, according to the above-described configuration, since the second region is sandwiched between the front engagement portion provided on the front side of the first region and the rear engagement portion provided on the rear side of the first region, the rigidity of the entire second pad member is improved.

Further, to the above-described according configuration, since the engagement portion is provided in the first region located in front of the second region, it is possible to further improve an effect of suppressing skin detachment in the event of a submarine phenomenon.

Further, according to the above-described configuration, since the length in the width direction of the first engagement portion provided in the thin portion is larger than the length in the width direction of the second engagement portion provided in the thick portion, for example, it is possible to maintain the rigidity of the first engagement portion of the thin portion and in the periphery thereof.

Further, according to the above-described configuration, since the thin portion is provided on the front side of the second pad member, for example, it is possible to reduce manufacturing costs by reducing the amount of materials (pad materials) to be used.

Further, according to the above-described configuration, since the engagement portion is provided at a position avoiding the floor fixing portion, the input load is distributed and the submarine phenomenon can be suppressed.

Further, according to the above-described configuration, since the floor fixing portion and the second region are located at an overlapping position in the right to left direction of the seat pad, the input load is distributed and an effect of suppressing the submarine phenomenon is further improved.

4

Figure 2:
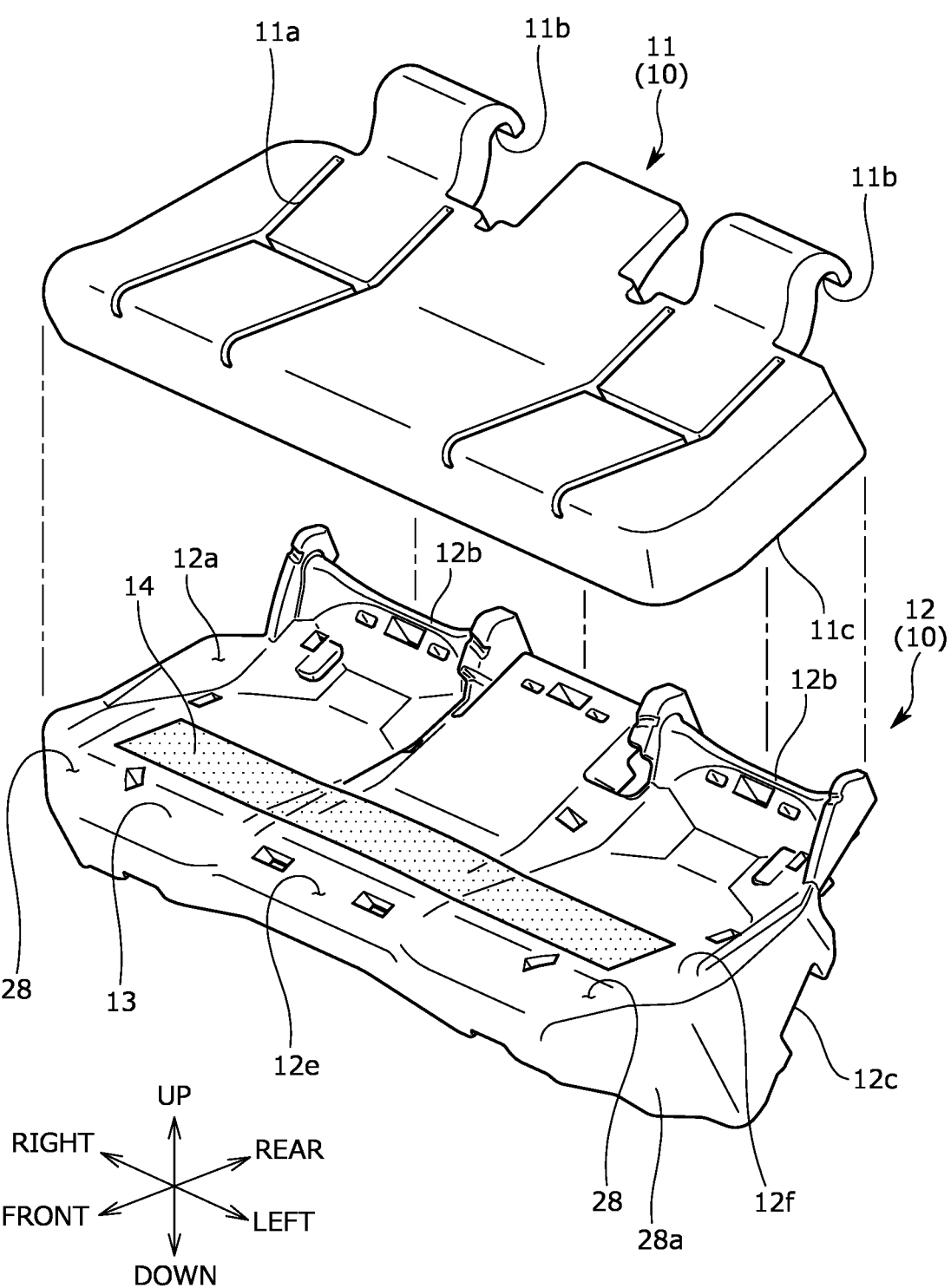

FIG. 2 is an exploded perspective view of a seat pad.

Figure 3:
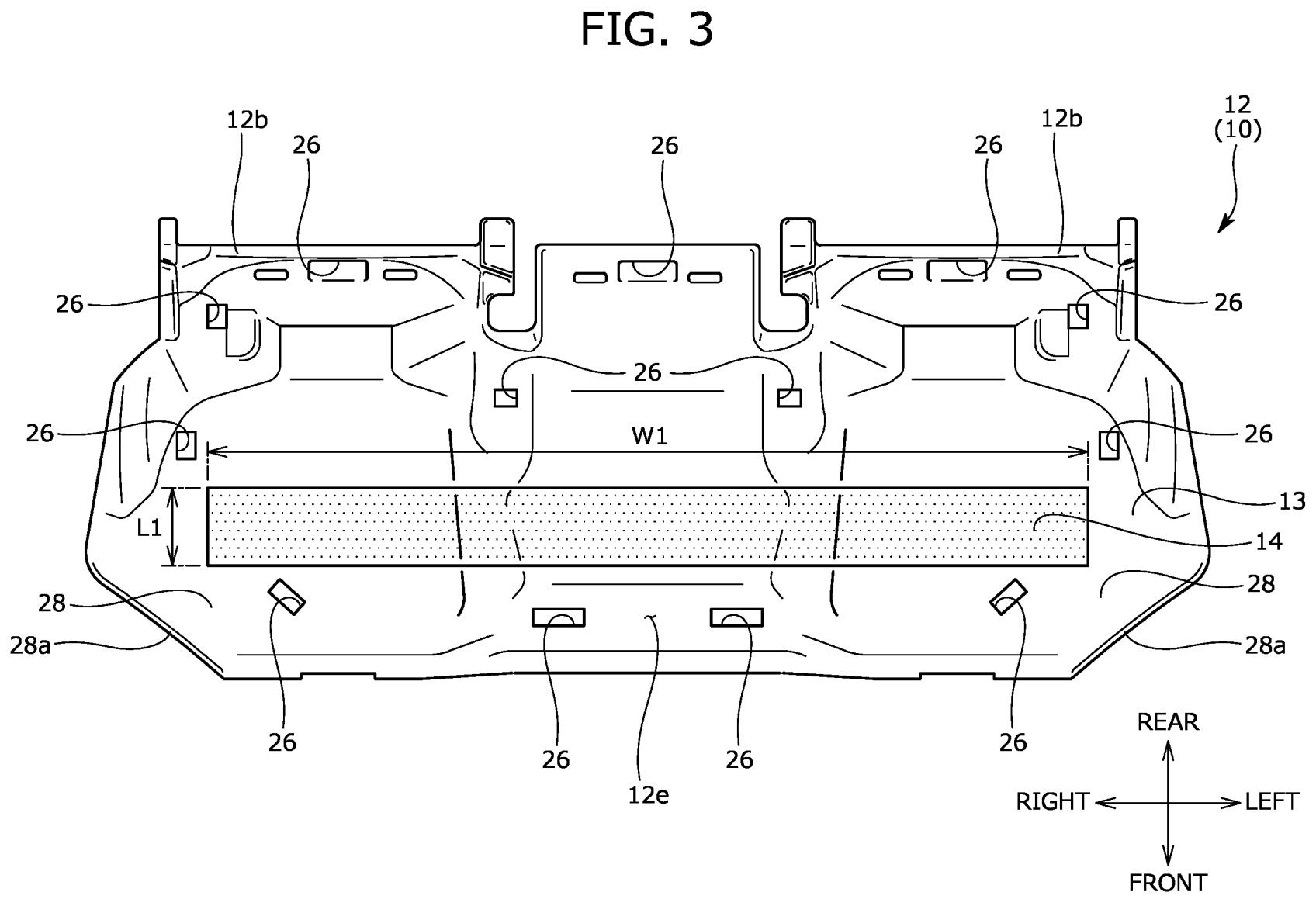

FIG. 3 is a top view of a second pad member.

Figure 4:
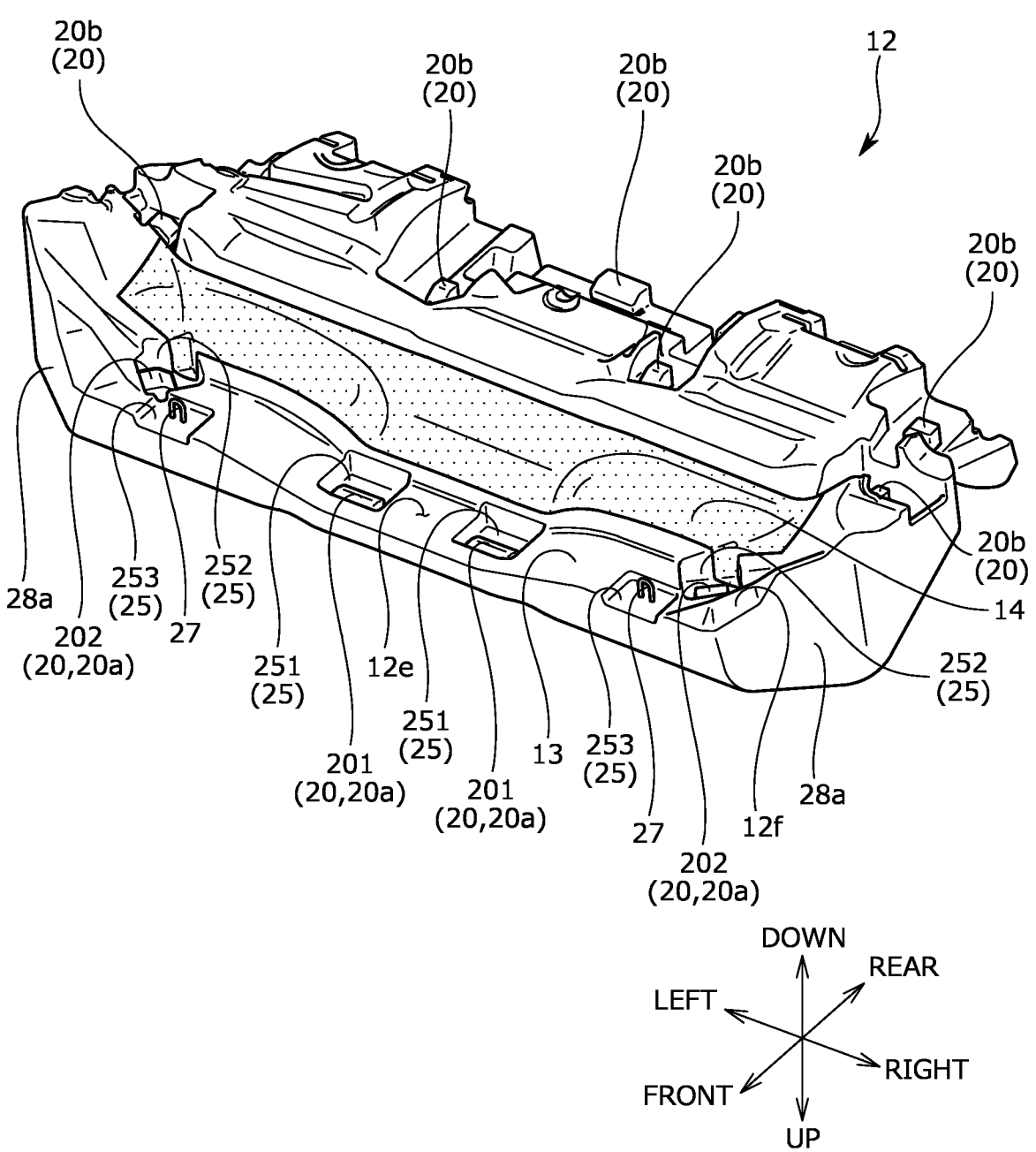

FIG. 4 is a diagram showing a lower surface of the second pad member and is a perspective view of the second pad member as viewed obliquely from below.

Figure 5:
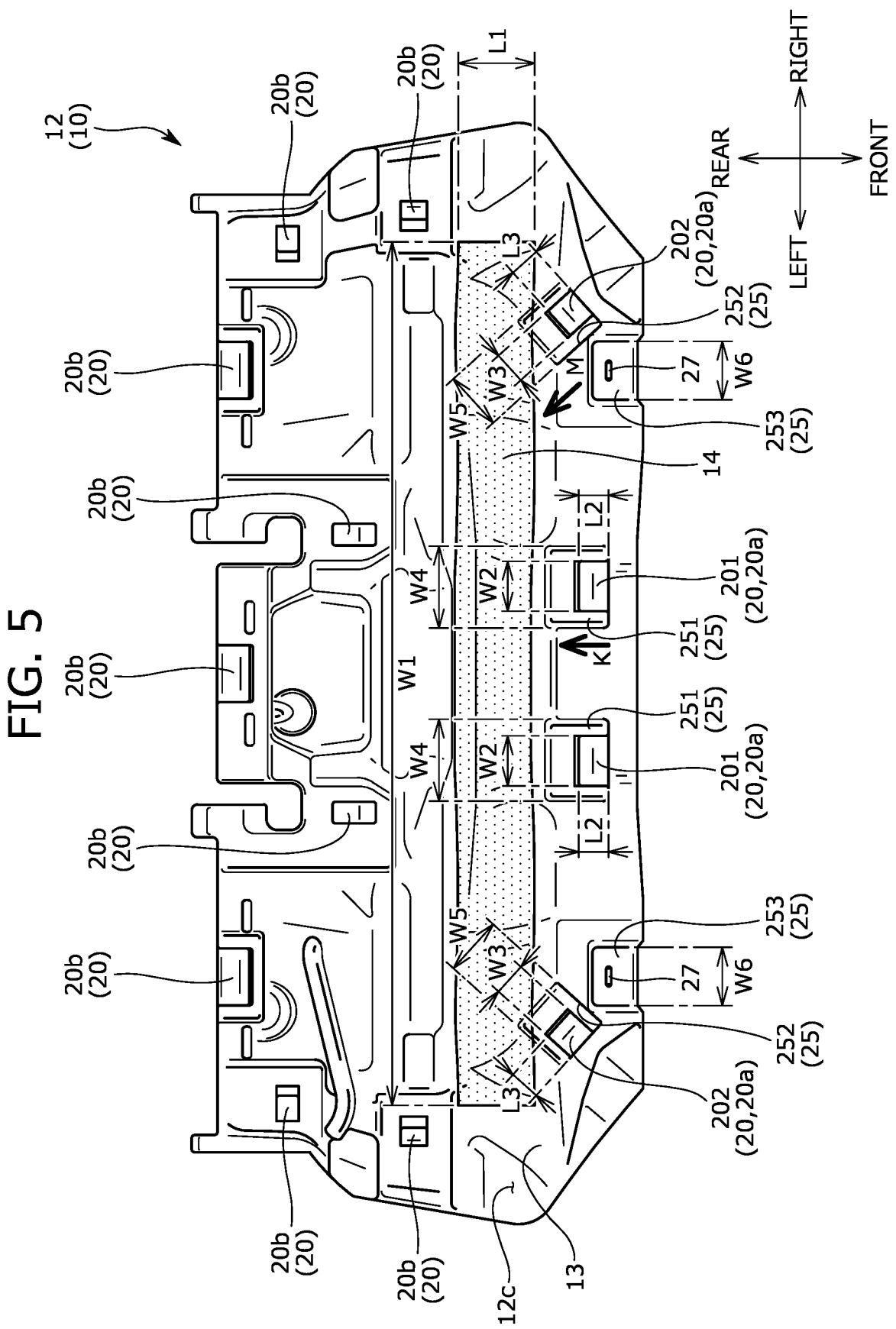

FIG. 5 is a bottom view of the second pad member.

Figure 6:
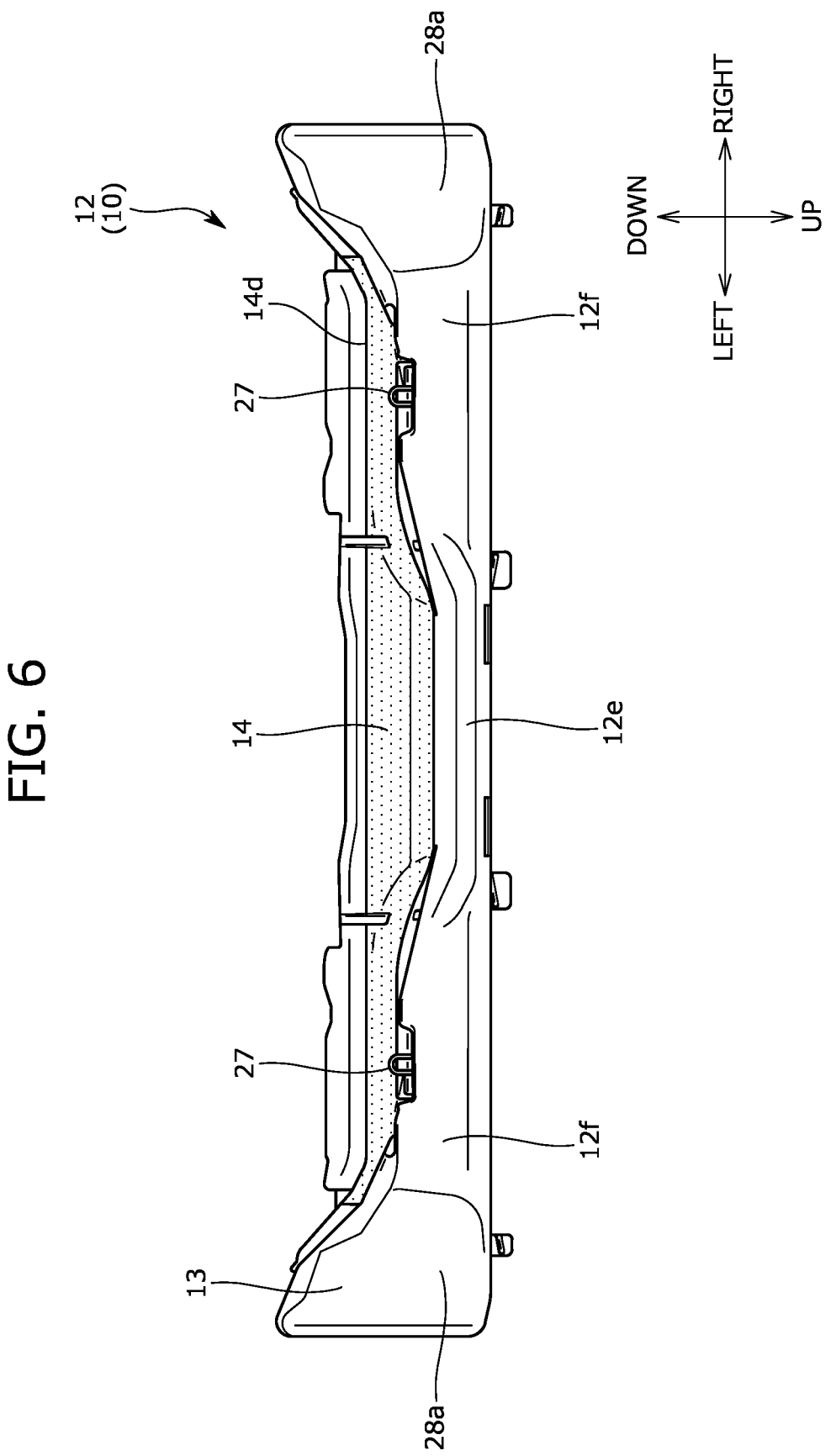

FIG. 6 is a front view of the second pad member as viewed from the front side.

Figure 7:
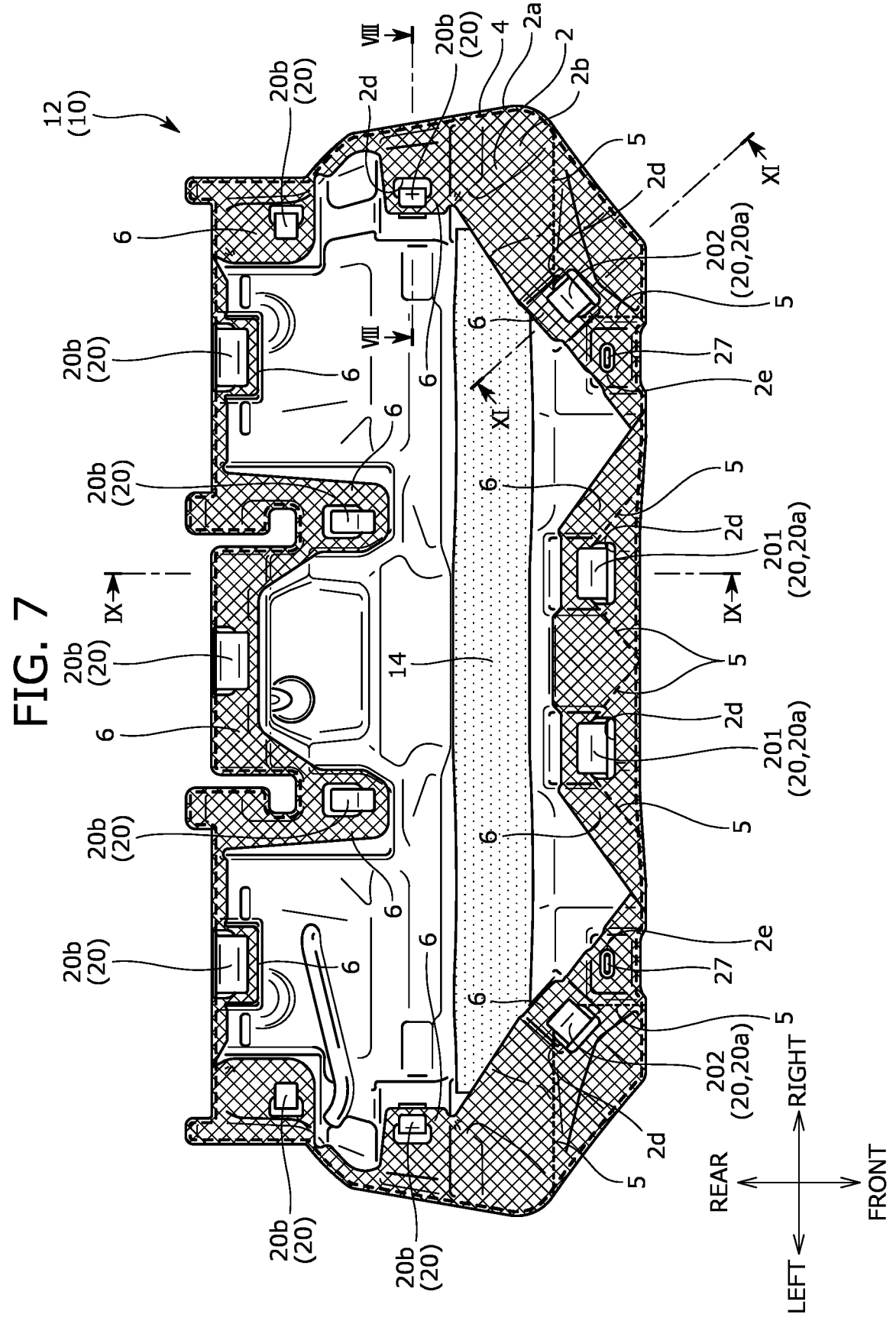

FIG. 7 is a bottom view of a seat cushion in a state in which a skin is attached to the second pad member.

Figure 8:
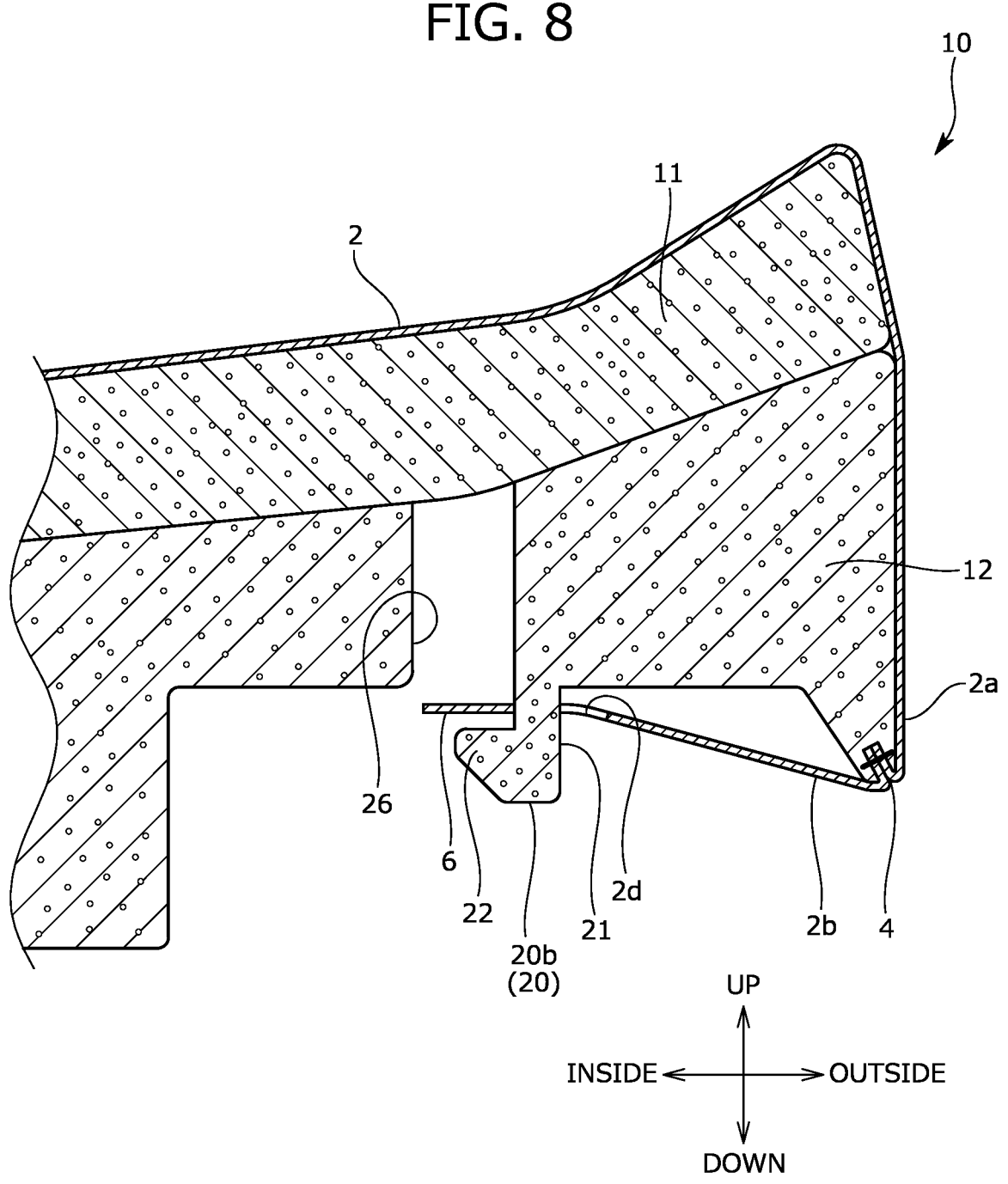

FIG. 8 is a cross-sectional view taken along a line VIII-VIII of FIG. 7 and is a diagram showing a configuration of a rear engagement portion.

Figure 9:
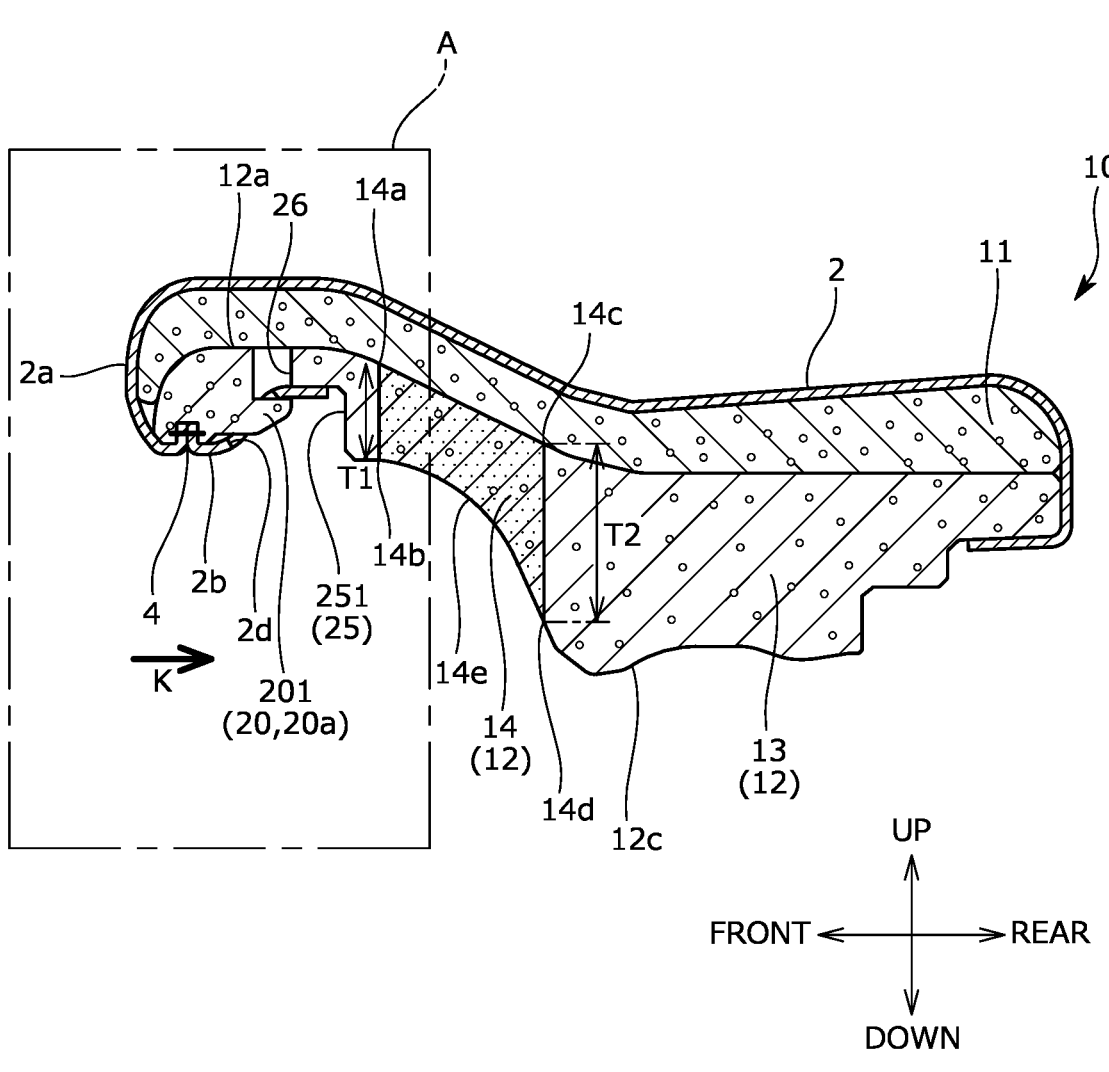

FIG. 9 is a cross-sectional view taken along a line IX-IX of FIG. 7.

Figure 10:
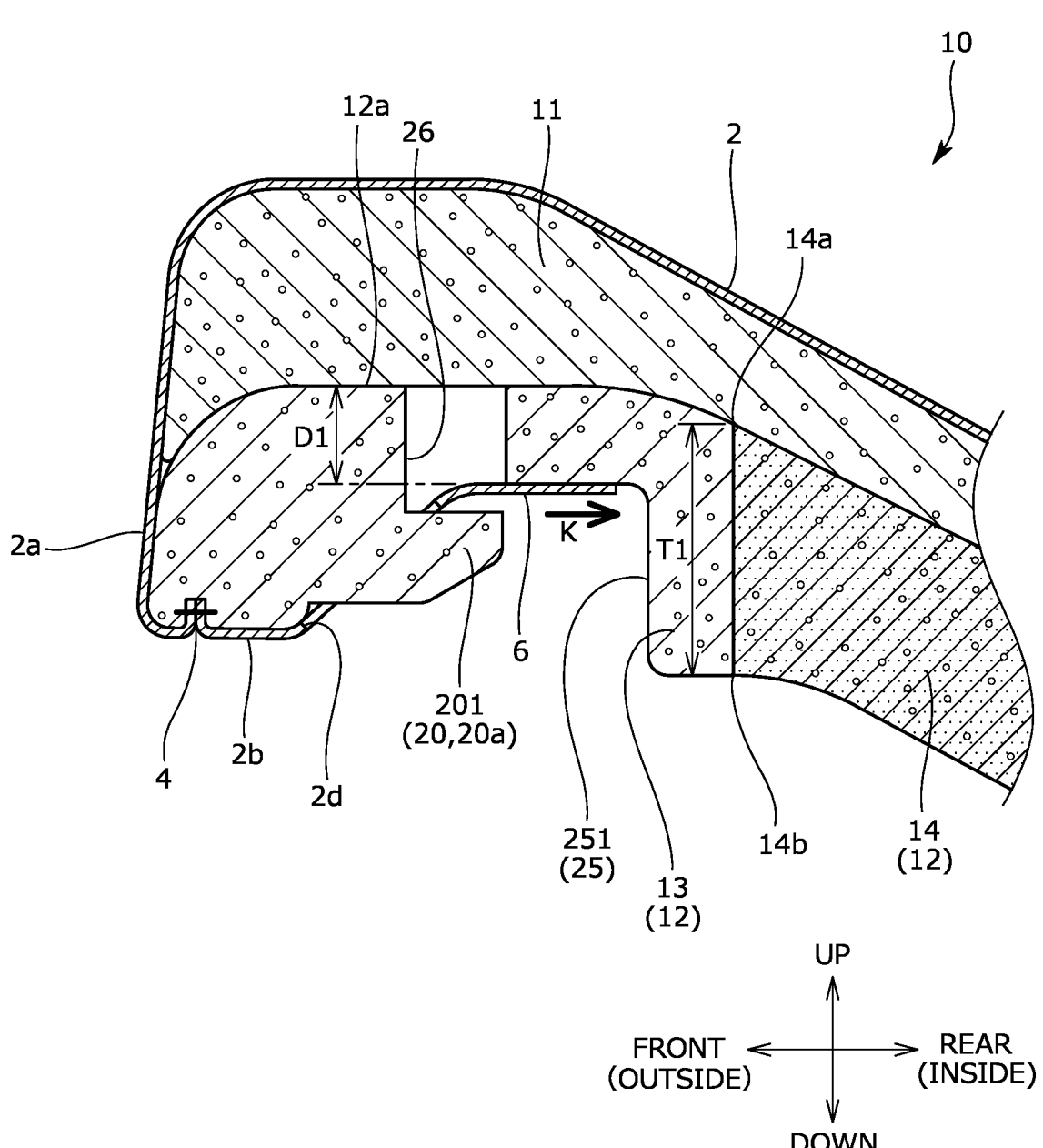

FIG. 10 is a partially enlarged cross-sectional view of a part A of FIG. 9 and is a diagram showing a configuration of a first engagement portion.

Figure 11:
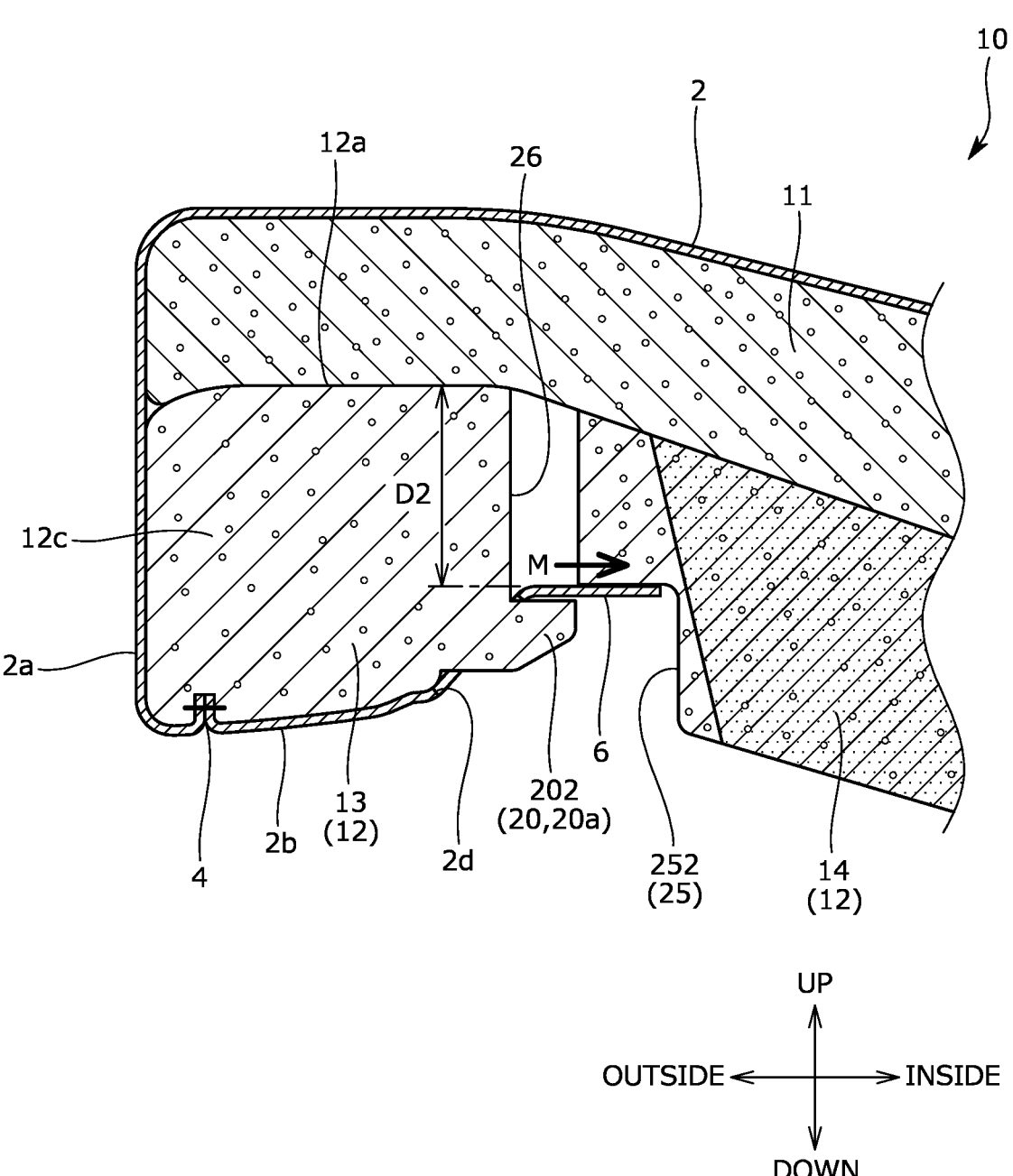

FIG. 11 is a cross-sectional view taken along a line XI-XI of FIG. 7 and is a diagram showing a configuration of a second engagement portion.

DESCRIPTION OF THE PREFERRED EMBODIMENTS

Hereinafter, a vehicle seat S (an example of a conveyance seat) according to an embodiment of the present invention (hereinafter, this embodiment) will be described with reference to FIGS. 1 to 11.

Additionally, in the following description, the "front to back direction" is the front to back direction of the vehicle seat S and is a direction that coincides with the direction in which the vehicle travels. Further, the "seat width direction" is the width direction of the vehicle seat S (in other words, the width direction of the seat body) and is a direction that coincides with the right to left direction as viewed from the occupant seated on the vehicle seat S. Further, the "up to down direction" is the up to down direction of the vehicle seat S and is a direction that coincides with the vertical direction when the vehicle is traveling on a horizontal plane.

<Vehicle Seat S>

Figure 1:
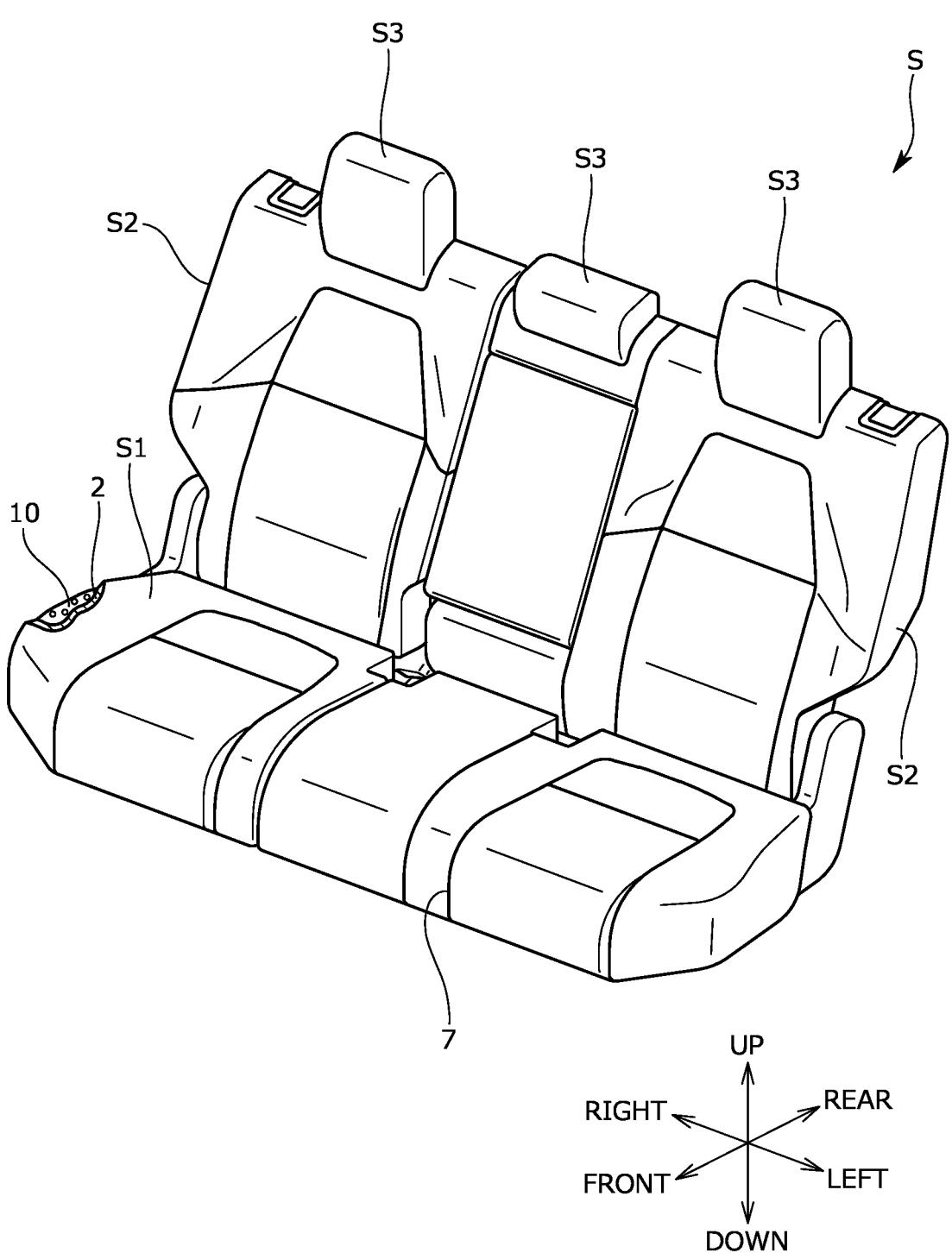
FIG. 1 is a perspective view of a vehicle seat according to this embodiment.

A basic configuration of the vehicle seat S according to this embodiment will be described with reference to FIG. 1. FIG. 1 is a perspective view of the vehicle seat S and a part of the vehicle seat S in FIG. 1 is shown as a configuration in which a skin 2 is removed from a seat cushion S1 for convenience of illustration.

The vehicle seat S is a rear seat of an automobile that is placed on the vehicle body floor and can seat three occupants. However, the present invention is not limited thereto and the vehicle seat S may be a front seat disposed on the front side of the vehicle and can also be used as a second-row middle seat or a third-row rear seat in a vehicle having three rows of seats in the front to back direction.

The vehicle seat S includes a seat cushion S1 serving as a sitting portion and supporting the buttocks of the seated occupant from below, a seat back S2 serving as a backrest portion and supporting the back of the seated occupant, and a headrest S3 disposed above the seat back S2 and supporting a head of the seated occupant as main components.

The seat cushion S1 includes, as shown in FIG. 1, a seat pad 10 and a skin 2 covering the seat pad 10. Further, a part of the skin 2 is pulled toward the seat pad 10 (the bottom side of the seat cushion S1) and hence a skin groove 7 is formed on the surface of the seat cushion S1.

<Seat Pad 10>

Next, the seat pad 10 of this embodiment will be described. FIG. 2 is an exploded perspective view showing the seat pad 10 of the seat cushion S1 of the vehicle seat S according to this embodiment. FIG. 3 is a top view of a second pad member 12 constituting the seat pad 10. FIG. 4 is a diagram showing a lower surface of the second pad member and is a perspective view of the second pad member as viewed obliquely from below. FIG. 5 is a bottom view of the second pad member 12. FIG. 6 is a front view of the second pad member 12 as viewed from the front side. FIG. 7 is a bottom view of the seat cushion S1 in a state in which the skin 2 is attached to the second pad member 12. FIG. 8 is a cross-sectional view taken along a line VIII-VIII of FIG. 7 and is a diagram showing a configuration of a rear engagement portion 20b. FIG. 9 is a cross-sectional view taken along a line IX-IX of FIG. 7 and FIG. 10 is a partially enlarged cross-sectional view of a part A of FIG. 9 and is a diagram showing a configuration of a first engagement portion 201. FIG. 11 is a cross-sectional view taken along a line XI-XI of FIG. 7 and is a diagram showing a configuration of a second engagement portion 202.

As shown in FIG. 2, the seat pad 10 is a pad laminate formed by vertically laminating a plurality of pad members. The seat pad 10 includes a first pad member 11 that is disposed on the upper side (seated occupant side) and a second pad member 12 that is disposed on the lower side (vehicle body side).

<First Pad Member 11>

The first pad member 11 is a buffer member formed of foamed resin such as urethane foam. As shown in FIG. 2, the first pad member 11 has substantially the same shape as the top shape of the second pad member 12. The first pad member 11 is attached to an upper surface 12a of the second pad member 12 to cover the second pad member 12 from above.

Further, a pull-in groove 11a for pulling the skin 2 is formed on the upper surface of the first pad member 11. The pull-in groove 11a includes a plurality of vertical pull-in grooves which are formed at intervals in the seat width direction and extend in the front to back direction of the seat and a horizontal pull-in groove which is formed at the substantially center portion in the front to back direction of the seat and extends in the seat width direction. Then, as shown in FIG. 2, the horizontal pull-in groove connects the vertical pull-in grooves.

Further, a plurality of attachment recesses 11b holding attachment protrusions 12b of the second pad member 12 to be described later are provided at the rear end of the first pad member 11.

<Second Pad Member 12>

The second pad member 12 is a buffer member formed of expanded polypropylene (EPP). The second pad member 12 is provided on the side of a lower surface 11c of the first pad member 11. The second pad member 12 is disposed to overlap the first pad member 11 in the up to down direction and supports the first pad member 11 from below.

As described above, the first pad member 11 is formed of foamed resin such as urethane foam. That is, the first pad member 11 and the second pad member 12 have different hardnesses, and in the seat pad 10 of this embodiment, the second pad member 12 is formed to be harder than the first pad member 11. That is, the first pad member 11 is formed with a lower hardness than the second pad member 12 and the second pad member 12 is formed with a higher hardness than the first pad member 11. By constructing the seat pad 10 with two layers of pad members having different hardnesses, the seating feeling is improved and the rigidity is maintained while forming the seat pad 10 to be thinner than a cushion pad constructed with one layer.

An attachment protrusion 12b having a convex shape to be attached to an attachment recess 11b of the first pad member 11 is formed at the rear end portion of the second pad member 12. The first pad member 11 can be fixed onto the second pad member 12 by fitting the attachment recess 11b of the first pad member 11 to the attachment protrusion 12b.

<First Region 13 and Second Region 14>

As described above, the second pad member 12 is formed of expanded polypropylene (EPP). Further, the second pad member 12 includes a first region 13 and a second region 14 having a higher hardness than the first region 13. That is, the second region 14 is formed of EPP having a higher hardness than EPP forming the first region 13. In other words, the first region 13 is formed of EPP having a lower hardness than the second region 14.

In the second pad member 12, the second region 14 is embedded in the first region 13 and the first region 13 and the second region 14 are formed by integral molding.

As shown in FIG. 3, the second region 14 is located slightly in front of the center of the second pad member 12 in the front to back direction when viewed from above. Further, the second region 14 is formed in an elongated rectangular shape extending in the right to left direction (seat width direction) and the first region 13 surrounds the second region 14. Further, as shown in FIG. 9, the second region 14 having a high hardness is provided to extend from the upper surface 12a to the lower surface 12c of the second pad member 12. In other words, the second region 14 extends from the upper surface to the lower surface of the first region 13.

The second region 14 is formed so that a length L1 thereof in the front to back direction is longer than a length L2 of a skin engagement portion 20 to be described later in a locking direction (a direction of drawing the skin 2).

Further, the second region 14 is formed so that a length W1 thereof in the right to left direction is longer than a length W2 in a direction (hereinafter, referred to as the length W2 in the width direction) orthogonal to the locking direction of the skin engagement portion 20.

When an occupant receives a strong impact from a car crash or the like, a phenomenon may occur in which an occupant becomes unrestrained by the seat belt, slips from the seat, and crawls under the dashboard or the like (so-called dive-down phenomenon). In order to suppress this phenomenon, it is preferable to suppress the occupant from slipping off their seats. In this embodiment, the seat cushion S1 is made difficult to be bent by providing the second region 14 having a high hardness in the second pad member 12 to extend in the seat width direction (the right to left direction). Accordingly, the occupant is suppressed from slipping off the seat.

Further, when the length L1 of the second region 14 in the front to back direction is made larger than the lengths L2 and L3 of the skin engagement portion 20 to be described later in the locking direction or the length W1 of the second region 14 in the right to left direction is made larger than the lengths W2 and W3 of the skin engagement portion 20 in the width direction, an effect of suppressing the submarine phenomenon is improved.

<Thin Portion 12e>

As shown in FIGS. 4 and 6, the second pad member 12 is provided with a thin portion 12e which is formed to be partially thin. In other words, the lower surface 12c of the second pad member 12 is provided with a recess which is recessed upward and a bottom portion of the recess is the thin portion 12e which is thinner than the periphery. The periphery of the thin portion 12e, that is, a portion other than the thin portion 12e is formed to be thicker than the thin portion 12e. Hereinafter, a portion which is formed to be thicker than the thin portion 12e is referred to as a thick portion 12f to be distinguished from the thin portion 12e.

The thin portion 12e is provided in the second pad member 12 to be located substantially at the center in the right to left direction and on the front side in the front to back direction. Further, the thin portion 12e is provided across the first region 13 and the second region 14 of the second pad member 12. By forming the thin portion 12e, it is possible to reduce the amount of the pad material to be used, that is, a resin material such as expanded polypropylene (EPP) and to reduce manufacturing costs.

<Corner Portion 28>

As shown in FIGS. 2 to 5, chamfered portions are formed at corner portions 28 located at both front right and left sides of the second pad member 12. In other words, slope surfaces 28a are formed on both front corner portions 28 so that the length in the seat width direction becomes narrower as it moves forward. Both end portions of the second pad member 12 are strengthened by forming the corner portion 28 with the slope surface 28a into the thick portion 12f.

<Skin 2>

The skin 2 covering the seat pad 10 will be described. The skin 2 is locked by the skin engagement portion 20 provided in the second pad member 12. The skin 2 is formed of cloth, rigid leather, genuine leather, or the like. As shown in FIG. 7, the skin 2 is formed by joining a first skin piece 2a covering the side surface of the seat pad 10 and a second skin piece 2b covering the lower surface of the seat pad 10. A suture line 4 that connects the first skin piece 2a and the second skin piece 2b is provided to be located, for example, at the corner portion on the lower end side of the second pad member 12 when the seat pad 10 is covered.

An opening 2d through which a claw portion 22 or the like of the skin engagement portion 20 to be described later passes is formed at the end portion of the skin 2. Hereinafter, the end portion of the skin 2 locked to the skin engagement portion 20 is referred to as an engaged portion 6. Since the engaged portion 6 is drawn by the skin engagement portion 20, the rigidity in the drawing direction may be improved. The engaged portion 6 is provided with a seam 5 which serves as a reinforced portion in the drawing direction and the rigidity of the engaged portion 6 is improved.

<Skin Engagement Portion 20>

As shown in FIGS. 4, 5, and 7, the lower surface 12c of the second pad member 12 is provided with a plurality of skin engagement portions 20 (engagement portions) for locking the end portion of the skin 2. The skin engagement portion 20 is formed, for example, as a claw-shaped protruding portion. Further, the skin engagement portion 20 is integrally formed with the second pad member 12.

The opening 2d (hooking hole) is formed at a position corresponding to the skin engagement portion 20 in the end portion (engaged portion 6) of the skin 2. By inserting the opening 2d into the skin engagement portion 20 to hook the engaged portion 6, the end portion of the skin 2 can be locked.

The skin 2 can be attached to the seat pad 10 by locking the end portion of the skin 2 to the skin engagement portion 20 while assembling the first pad member 11 and the second pad member 12.

As shown in FIGS. 5 and 7, the skin engagement portion 20 is provided at a position avoiding the second region 14 in the lower surface of the second pad member 12. That is, the skin engagement portion 20 is provided in the first region 13 formed of a material having a lower hardness than the second region 14.

If the entire second pad member 12 is formed of EPP with the same high hardness as the second region 14, the end portion that locks the skin 2 will be difficult to be bent and hence the skin 2 is not easily assembled. However, since the periphery of the second pad member 12 is the first region 13 having a low hardness, the skin engagement portion 20 of the first region 13 or the periphery thereof bends and the skin 2 is easily assembled when assembling the skin 2.

The skin engagement portion 20 includes a front engagement portion 20a which is provided on the front side of the lower surface 12c of the second pad member 12 and the rear engagement portion 20b which is provided on the rear side.

The front engagement portion 20a and the rear engagement portion 20b for locking the skin 2 are provided in the first region 13. Since the first region 13 has a lower hardness than the second region 14, the first region 13 is easily bent than the second region 14. Therefore, the skin 2 is easily assembled by bending the first region 13 when assembling the skin 2.

Further, the second region 14 is sandwiched between the front engagement portion 20a and the rear engagement portion 20b in the second pad member 12. When the second region 14 is disposed in this way, for example, the rigidity of the second pad member is improved.

Further, a part of the rear engagement portion 20b is disposed on the outside of the second region 14 in the right to left direction. Since a part of the rear engagement portion 20b is disposed in this way, the skin 2 drawn from the right and left end portions of the seat cushion is easily hooked.

Hereinafter, an example of the rear engagement portion 20b provided on the rear side of the second pad member 12 will be described first and then the front engagement portion 20a will be described.

<Rear Engagement Portion 20b>

As shown in FIG. 8, the rear engagement portion 20b includes a pillar portion 21 which erects from the lower surface 12c of the second pad member 12 and the claw portion 22 which is provided at the tip of the pillar portion 21 and is formed to have an L-shaped cross section as a whole. Additionally, the lower surface 12c of the second pad member 12 becomes the lower surface of the seat pad 10 when the second pad member 12 and the first pad member 11 are combined to form the seat pad 10.

The claw portion 22 of the rear engagement portion 20b extends toward the inside of the seat pad 10. In other words, the claw portion 22 is formed to extend in a direction of drawing the skin 2 (referred to as the locking direction) when the skin 2 is attached.

Since the claw portion 22 extends toward the inside of the seat pad 10, that is, in the locking direction of drawing the skin 2, the engaged portion 6 does not easily come off from the rear engagement portion 20b and the skin 2 does not easily come off from the seat pad 10 after attaching the skin 2.

In the rear engagement portion 20b, as shown in FIG. 8, the top portion of the rear engagement portion 20b may be chamfered. Specifically, the claw portion 22 that hooks the skin 2 may be chamfered. Since the claw portion 22 of the skin engagement portion 20 is chamfered, the opening 2d of the skin 2 can easily pass through the rear engagement portion 20b and hence the skin 2 is easily assembled.

Additionally, the tips of the first engagement portion 201 and the second engagement portion 202 (the front engagement portion 20a) to be described later may also be chamfered similarly to the rear engagement portion 20b. As shown in FIGS. 10 and 11, since the tip is chamfered, the opening 2d of the skin 2 can easily pass through the first engagement portion 201 and the second engagement portion 202 and hence the skin 2 is easily assembled.

<Front Engagement Portion 20a>

As shown in FIG. 10, a recess 25 which is recessed upward is formed on the front side of the second pad member 12 and the front engagement portion 20a is formed as the claw portion 22 which protrudes toward the inside of the seat pad 10 (the locking direction of drawing the skin) from the side surface of the recess 25 inside the recess 25.

Since the claw portion 22 of the front engagement portion 20a extends toward the inside of the seat pad 10 in the locking direction of drawing the skin 2, the engaged portion 6 does not easily come off from the front engagement portion 20a and the skin 2 does not easily come off from the seat pad 10 after attaching the skin 2.

The front engagement portion 20a includes the first engagement portion 201 which is disposed in the thin portion 12e and the second engagement portion 202 which is disposed in the thick portion 12f.

<First Engagement Portion 201>

As shown in FIG. 5, the first engagement portion 201 is provided inside a first recess 251 formed in the thin portion 12e. The first recess 251 is a recess which is recessed upward and is formed to have a substantially rectangular shape when viewed from below. The first engagement portion 201 is formed as a protruding portion that protrudes in a direction of drawing the skin 2 (the locking direction, the direction indicated by an arrow K in FIG. 5) from the side surface of the first recess 251 in each of two first recesses 251 formed in the thin portion 12e. In other words, the first engagement portion 201 extends in a direction perpendicular to the front surface of the second pad member 12.

The first engagement portion 201 is integrally formed with the second pad member 12. By inserting the first engagement portion 201 into the opening 2d formed in the engaged portion 6 of the skin 2, the skin 2 can be hooked and locked.

Further, as shown in FIGS. 9 and 10, a through hole 26 which extends from the bottom portion of the first recess 251 to the upper surface 12a of the second pad member 12 is formed above the first engagement portion 201. The length D1 (depth) of the through hole 26 formed in the thin portion 12e is formed to be smaller than the maximum thickness T2 of the second region 14.

<Second Engagement Portion 202>

As shown in FIGS. 5, 7, and 8, the second engagement portion 202 is provided inside a second recess 252 formed in the thick portion 12f.

More specifically, the second engagement portion 202 is formed as a protruding portion that protrudes in a direction of drawing the skin 2 (the locking direction, the direction indicated by an arrow M in FIG. 5) from the side surface of the second recess 252.

The second engagement portion 202 is integrally formed with the second pad member 12. By passing the second engagement portion 202 through the opening 2d formed in the engaged portion 6 of the skin 2, the skin 2 can be hooked and locked.

As shown in FIG. 11, the through hole 26 which extends from the bottom portion of the second recess 252 to the upper surface 12a of the second pad member 12 is formed above the second engagement portion 202. The length D2 (depth) of the through hole 26 formed in the thick portion 12f is formed to be smaller than the maximum thickness T2 (see FIG. 9) of the second region 14.

Further, as shown in FIG. 8, the second region 14 extends from the upper surface 12a to the lower surface 12c of the second pad member 12. The skin engagement portion 20 is provided to be located above a rear lower end portion 14d of the second region 14 (the lower end of the second region 14). Accordingly, since the load input to the end portion of the skin, for example, in the event of a submarine phenomenon is reduced, skin detachment is suppressed. In particular, the front engagement portion 20a disposed in front of the second region 14 is disposed above the rear lower end portion 14d of the second region 14 and hence an effect of suppressing skin detachment in the event of the submarine phenomenon can be further improved.

Further, the upper end of the skin engagement portion 20 is disposed below the front upper end portion 14a of the second region 14. By disposing the skin engagement portion 20 in this way, it is possible to further improve an effect of suppressing skin detachment, for example, in the event of a submarine phenomenon.

When comparing the length (hereinafter, the thickness T1) between a front upper end portion 14a corresponding to a front upper end and a front lower end portion 14b corresponding to a front lower end and a length (hereinafter, the thickness T2) between a rear upper end portion 14c corresponding to a rear upper end and a rear lower end portion 14d corresponding to a rear lower end in the second region 14, the thickness T2 is large.

Further, the lower surface of the second region 14 is provided with a curved portion 14e which is curved upward as shown in FIG. 9. By forming the lower surface of the second region 14 to be curved upward, a wider space can be ensured below the second pad member 12.

<Comparison of Length in Width Direction>

As shown in FIG. 5, the first engagement portion 201 disposed on the thin portion 12e is formed to be wider than the second engagement portion 202 provided in the thick portion 12f.

More specifically, the length W2 in the width direction orthogonal to the locking direction of the first engagement portion 201 (the direction indicated by an arrow K in FIG. 5) is larger than the length W3 in the width direction orthogonal to the locking direction of the second engagement portion 202 (the direction indicated by an arrow M in FIG. 5).

By forming the first engagement portion 201 provided in the thin portion 12e in this way, it is possible to improve the strength of, for example, the first engagement portion 201 and the thin portion 12e in the periphery thereof.

Further, the length W4 in the width direction of the first recess 251 provided with the first engagement portion 201 is formed to be larger than the length W5 in the width direction of the second recess 252 provided with the second engagement portion 202. By further widening the length W4 in the width direction of the first recess 251, for example, the skin 2 is easily locked (latched).

The wide first engagement portion 201 is disposed in front of the second pad member 12 and the second region 14 is disposed behind the wide first engagement portion 201.

Further, as shown in FIG. 5, the second engagement portions 202 which are narrower than the first engagement portions 201 are arranged to sandwich the first engagement portions 201 in the right to left direction when viewed from the front side. Further, the narrow second engagement portion 202 is disposed closer to the second region 14 than the first engagement portion 201.

Further, the second region 14 is formed so that the length L1 thereof in the front to back direction is larger than the length W2 in the right to left direction (width direction) of the wide first engagement portion 201.

<Striker 27>

The lower surface 12c of the second pad member 12 is provided with a striker 27 serving as a floor fixing portion for fixing the second pad member 12 to the vehicle body floor. The striker 27 is formed as a member that is formed by bending a wire in a U shape and is attached to the second pad member 12 by insert-molding. By engaging the striker 27 with a latch device (not shown) provided on the vehicle body floor, the vehicle seat S including the second pad member 12 can be fixed to the vehicle body floor.

Two strikers 27 are provided inside the first region 13 and each striker 27 is disposed to correspond to the position of the latch device provided in the vehicle body floor.

The skin engagement portion 20 is provided at a position avoiding the striker 27 disposed inside the first region 13. In particular, the first engagement portion 201 provided in the thin portion 12e and the second engagement portion 202 provided in the thick portion 12f are arranged at a position avoiding the striker 27. In other words, the first engagement portion 201 and the second engagement portion 202 are arranged not to overlap the position of the striker 27. Since the first engagement portion 201 and the second engagement portion 202 are arranged at a position avoiding the striker 27, the input load is distributed, and for example, a submarine phenomenon can be suppressed.

Further, the striker 27 and the second region 14 are located at an overlapping position in the right to left direction. That is, as shown in FIG. 6, the striker 27 is disposed at a position overlapping the second region 14 when the second pad member 12 is viewed from the front side. Further, as shown in FIG. 6, the striker 27 is disposed above the rear lower end portion 14d of the second region 14.

Additionally, the end portion of the skin 2 is provided with an opening 2e (see FIG. 7) through which the striker 27 passes and the skin 2 can be attached to the second pad member 12 by inserting the striker 27 through the opening 2e.

As shown in FIG. 5, two strikers 27 are arranged to sandwich two first engagement portions 201 provided in the thin portion 12e. The second engagement portion 202 provided in the thick portion 12f is disposed near the striker 27. The striker 27 is attached to the second pad member 12 by insert-molding and a wire or the like that supports the striker 27 is embedded around the striker 27. Therefore, the strength is improved compared to the other portions and the strength of the second engagement portion 202 can be improved by disposing the second engagement portion 202 near the striker 27.

The second engagement portion 202 is disposed to be separated from the striker 27 by a predetermined distance in the seat width direction (the right to left direction of the vehicle seat S). Further, the second engagement portion 202 is disposed to be separated from the striker 27 by a predetermined distance in the front to back direction of the vehicle seat S. More specifically, the second engagement portion 202 is disposed behind the striker 27.

Further, as shown in FIG. 5, each striker 27 is disposed between the first engagement portion 201 and the second engagement portion 202 which are adjacent to each other. Since the skin 2 is also fixed by the striker 27, the skin fixing force of fixing the skin 2 can be improved by providing the striker 27 between the first engagement portion 201 and the second engagement portion 202 for locking the skin 2.

Further, the second pad member 12 is provided with a striker recess 253 (fixing portion recess) including the striker 27 therein. The striker recess 253 is formed to be recessed upward similarly to the first recess 251 and the second recess 252. Since the striker 27 is provided inside the striker recess 253, the protrusion amount in which the striker 27 protrudes from the lower surface 12c of the second pad member 12 decreases and hence the second pad member 12 can be made more compact.

Further, the striker recess 253 communicates with the front end of the second pad member 12. In other words, the striker recess 253 extends to the front end of the second pad member 12 and the front side portion of the striker recess 253 opens to the front end of the second pad member 12. Since the striker recess 253 communicates with the front end of the second pad member 12, it is possible to check whether the striker 27 engages with the latch device provided in the vehicle body floor when viewed from the front side of the seat, for example, when the second pad member 12 is attached to the vehicle body floor.

Further, the striker recess 253 is formed so that the length W6 thereof in the seat width direction is smaller than the length W4 in the width direction of the first recess 251 including the first engagement portion 201. By reducing the length W6 in the width direction of the striker recess 253, for example, the first recess 251 and the striker recess 253 can be visually distinguished and the attachment of the skin 2 becomes easier.

Additionally, the striker 27 (floor fixing portion) provided in the second pad member 12 is not limited to the U-shaped wire member and may have different shapes. For example, the striker 27 may be formed in an L shape. Further, the latch device may be provided in the second pad member 12 as the floor fixing portion. Alternatively, the striker may be provided in the vehicle body floor and the latch device may be attached to the striker.

This embodiment has been described above with reference to the drawings. Additionally, the above-described embodiments are merely examples to facilitate understanding of the present invention and do not limit the present invention. That is, the shapes, dimensions, arrangement, and the like of the members described in this embodiment can be changed and improved without departing from the spirit of the present invention and the present invention includes, of course, equivalents thereof.

Further, the vehicle seat has been exemplified as the conveyance seat of the present invention and the configuration example thereof has been described. However, the present invention is not limited to a vehicle seat mounted on a ground traveling vehicle having wheels such as an automobile or a railway, but may also be a seat mounted on an aircraft, a ship, or the like that moves in a place other than the ground.

REFERENCE SIGNS LIST

S Vehicle seat
S1 Seat cushion
S2 Seat back
S3 Headrest
2 Skin
  2a First skin piece
  2b Second skin piece
  2d, 2e Opening
4 Suture line 5 Seam (reinforced portion)
6 Engaged portion
7 Skin groove
10 Seat pad
11 First pad member
  11a Pull-in groove
  11b Attachment recess
  11c Lower surface
12 Second pad member
  12a Upper surface
  12b Attachment protrusion
  12c Lower surface
  12e Thin portion
  12f Thick portion
13 First region
14 Second region
  14a Front upper end portion
  14b Front lower end portion
  14c Rear upper end portion
  14d Rear lower end portion (lower end of second region)
  14e Curved portion
20 Skin engagement portion (engagement portion)
  20a Front engagement portion
  20b Rear engagement portion
  201 First engagement portion
  202 Second engagement portion
21 Pillar portion
22 Claw portion
25 Recess
  251 First recess
  252 Second recess
  253 Striker recess (fixing portion recess)
26 Through hole
27 Striker (floor fixing portion)
28 Corner portion
28a Slope surface

What is claimed is:

1. A conveyance seat, comprising:
a seat pad; and
a skin which covers the seat pad,
wherein the seat pad includes a first pad member and a second pad member that is harder than the first pad member,
wherein the second pad member includes a first region and a second region which is harder than the first region,
wherein an engagement portion that locks the skin is provided in the first region of the second pad member,
wherein the engagement portion includes a front engagement portion which is provided on the front side of the first region and a rear engagement portion which is provided on the rear side of the first region, and
wherein the second region is sandwiched between the front engagement portion and the rear engagement portion.

2. The conveyance seat according to claim 1,
wherein the engagement portion is provided in the first region located in front of the second region or the first region located behind the second region.

3. The conveyance seat according to claim 1,
wherein the second region extends from an upper surface to a lower surface of the second pad member, and
wherein the engagement portion is provided above a lower end of the second region.

4. The conveyance seat according to claim 3,
wherein the engagement portion provided above the lower end of the second region is provided in the first region located in front of the second region.

5. The conveyance seat according to claim 1,
wherein the first region of the second pad member is provided with a thin portion which is formed to be partially thin and a thick portion which is formed to be thicker than the thin portion,
wherein the engagement portion includes a first engagement portion which is provided in the thin portion and a second engagement portion which is provided in the thick portion, and
wherein a length of the first engagement portion in a width direction orthogonal to a locking direction in which the first engagement portion locks the skin is larger than a length of the second engagement portion in a width direction orthogonal to a locking direction in which the second engagement portion locks the skin.

6. The conveyance seat according to claim 5,
wherein the thin portion of the first region is provided in front of the second region, and
wherein the first engagement portion is disposed in front of the second region.

7. The conveyance seat according to claim 1,
wherein the first region of the second pad member is provided with a floor fixing portion that fixes the second pad member to a vehicle body floor, and
wherein the engagement portion is provided at a position avoiding the floor fixing portion.

8. The conveyance seat according to claim 7,
wherein the floor fixing portion and the second region are located at an overlapping position in a right to left direction of the seat pad.

9. The conveyance seat according to claim 1, further comprising:
a seat cushion which supports buttocks of an occupant and includes the seat pad and the skin;
a seat back which supports a back of the occupant; and
a headrest which is coupled to the seat back and supports a head of the occupant.

10. A conveyance seat, comprising:
a seat pad; and
a skin which covers the seat pad,
wherein the seat pad includes a first pad member and a second pad member that is harder than the first pad member,
wherein the second pad member includes a first region and a second region which is harder than the first region,
wherein an engagement portion that locks the skin is provided in the first region of the second pad member,
wherein the second region extends from an upper surface to a lower surface of the second pad member,
wherein the engagement portion is provided above a lower end of the second region, and
wherein the engagement portion provided above the lower end of the second region is provided in the first region located in front of the second region.

11. A conveyance seat, comprising:
a seat pad; and
a skin which covers the seat pad,
wherein the seat pad includes a first pad member and a second pad member that is harder than the first pad member, wherein the second pad member includes a first region and a second region which is harder than the first region, wherein an engagement portion that locks the skin is provided in the first region of the second pad member, 5 wherein the first region of the second pad member is provided with a floor fixing portion that fixes the second pad member to a vehicle body floor, wherein the engagement portion is provided at a position avoiding the floor fixing portion, and 10 wherein the floor fixing portion and the second region are located at an overlapping position in a right to left direction of the seat pad.

\* \* \* \* \*